(12) United States Patent
Oesterling et al.

(10) Patent No.: US 11,462,021 B2
(45) Date of Patent: Oct. 4, 2022

(54) OBSTACLE DETECTION AND NOTIFICATION FOR MOTORCYCLES

(71) Applicant: GM GLOBAL TECHNOLOGY OPERATIONS LLC, Detroit, MI (US)

(72) Inventors: Christopher L. Oesterling, Troy, MI (US); David H. Clifford, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/148,398

(22) Filed: Jan. 13, 2021

(65) Prior Publication Data

US 2022/0222475 A1    Jul. 14, 2022

(51) Int. Cl.
| | |
|---|---|
| *G06V 20/58* | (2022.01) |
| *B60R 1/00* | (2022.01) |
| *H04W 4/029* | (2018.01) |
| *H04W 4/02* | (2018.01) |
| *H04W 4/38* | (2018.01) |

(52) U.S. Cl.
CPC .............. *G06V 20/58* (2022.01); *B60R 1/00* (2013.01); *H04W 4/027* (2013.01); *H04W 4/029* (2018.02); *H04W 4/38* (2018.02); *B60R 2300/202* (2013.01); *B60R 2300/8086* (2013.01); *B60R 2300/8093* (2013.01)

(58) Field of Classification Search
None
See application file for complete search history.

(56) References Cited

U.S. PATENT DOCUMENTS

| | | | | |
|---|---|---|---|---|
| 2015/0109149 | A1* | 4/2015 | Duncan | G02B 27/01 340/944 |
| 2015/0228066 | A1* | 8/2015 | Farb | G06V 20/58 348/148 |
| 2016/0150070 | A1* | 5/2016 | Goren | H04W 48/04 455/418 |
| 2017/0101056 | A1* | 4/2017 | Park | G08G 1/04 |
| 2017/0336218 | A1* | 11/2017 | Beaurepaire | G08G 1/166 |
| 2018/0012494 | A1* | 1/2018 | Walessa | B60W 40/04 |
| 2018/0075747 | A1* | 3/2018 | Pahwa | B60W 40/09 |
| 2019/0137622 | A1* | 5/2019 | Lopez-Hinojosa | G01S 7/4802 |
| 2019/0318179 | A1* | 10/2019 | Jiang | G06V 20/647 |

(Continued)

*Primary Examiner* — Ricky Chin
(74) *Attorney, Agent, or Firm* — Lorenz & Kopf, LLP

(57) ABSTRACT

An obstacle detection and notification system for a motorcycle. The system includes a forward looking camera and a backward looking camera mountable to the motorcycle and a processor in operable communication with the forward looking camera and the backward looking camera. The processor executes program instructions to execute processes including: receiving video from the of the forward looking camera and the backward looking camera, performing a computer vision and machine learning based object detection and tracking process to detect, classify and track obstacles in the video and to output detected object data, defining a blind spot region around one or more other vehicles using the detected object data, determining whether the motorcycle is located in the blind spot region, and outputting audible, tactile or visual feedback, via an output system, to a rider of the motorcycle when the motorcycle is determined to be located in the blind spot region.

18 Claims, 4 Drawing Sheets

(56) References Cited

U.S. PATENT DOCUMENTS

| | | | |
|---|---|---|---|
| 2020/0023797 A1* | 1/2020 | Volos | B60R 21/013 |
| 2020/0041997 A1* | 2/2020 | Tuukkanen | G05D 1/0088 |
| 2020/0207375 A1* | 7/2020 | Mehta | B60W 60/00276 |
| 2021/0089048 A1* | 3/2021 | Tran | B60R 25/257 |
| 2021/0094577 A1* | 4/2021 | Shalev-Shwartz | G06V 20/58 |
| 2021/0108926 A1* | 4/2021 | Tran | G06N 3/04 |

* cited by examiner

OBSTACLE DETECTION AND NOTIFICATION FOR MOTORCYCLES

INTRODUCTION

The technical field generally relates to obstacle detection and notification for motorcycles, and more particularly relates to use of computer vision and machine learning to provide feedback of potential obstacles to a rider.

Automotive Advanced Driver Assistance Systems (also known as "ADAS") have become, in recent years, a standard in the car industry, inter alia due to the fact that safety is a main concern for car manufacturers. A primary concern of motorcycle riders is collisions with obstacles of any kind. There are some obstacles and situations that are of particular concern for motorcycle riders that would desirably be addressed by a suitable obstacle detection and notification system.

The motorcycle industry has not, generally, implemented ADAS features, which may be because of the relative cost of ADAS and a motorcycle and also because there are various difficulties that are specific to the motorcycle's environment. For example, motorcycles have very limited space to place ADAS. Providing alerts to motorcycle riders is also a challenge, as the riders wear a helmet, and operate in a noisy environment that is affected by wind, engine noise, etc. Furthermore, the viewing angle of a motorcycle rider wearing a helmet is limited, and placing visual indicators (such as a display for providing visual indications) on the motorcycle itself is challenging in terms of its positioning on the motorcycle at a location that is visible to the rider when riding the motorcycle. Still further, motorcycles behave differently than cars, their angles (e.g. lean angle) relative to the road shift much quicker and more dramatically than car angles with respect to the road, especially when the motorcycle leans, accelerates and brakes.

Accordingly, it is desirable to provide systems and methods for obstacle detection and notification for a motorcycle that are low in complexity and cost to implement on a motorcycle and that are able to provide enhanced situational awareness for a motorcycle rider to support avoiding collisions and accidents. Furthermore, other desirable features and characteristics of the present invention will become apparent from the subsequent detailed description and the appended claims, taken in conjunction with the accompanying drawings and the foregoing technical field and background.

SUMMARY

In one aspect, an obstacle detection and notification system for a motorcycle is disclosed. The system includes a forward looking camera and a backward looking camera mountable to the motorcycle and a processor in operable communication with the forward looking camera and the backward looking camera. The processor executes program instructions to execute processes including: receiving video from the of the forward looking camera and the backward looking camera, performing a computer vision and machine learning based object detection and tracking process to detect, classify and track obstacles in the video and to output detected object data, defining a blind spot region around one or more other vehicles using the detected object data, determining whether the motorcycle is located in the blind spot region, and outputting audible, tactile or visual feedback, via an output system, to a rider of the motorcycle when the motorcycle is determined to be located in the blind spot region.

In embodiments, the processes include outputting audible feedback to a driver of the one or more other vehicles when the motorcycle is determined to be located in the blind spot region.

In embodiments, defining the blind spot region around the one or more other vehicles uses the detected object data and a relative velocity of the one or more other vehicles and the motorcycle.

In embodiments, the detected object data includes a bounding box around each detected motorcycle in the video and an associated label classifying the bounding box as a motorcycle. In embodiments, defining the blind spot region around the one or more other vehicles includes spatially assigning a predetermined blind spot region at a predetermined location relative to the bounding box.

In embodiments, visual feedback is output to the rider via a rider lighting device in the form of a plurality of lights arranged in a ring. Individual lights are lit to indicate directionality of the blind spot region relative to the motorcycle. In embodiments, the plurality of lights emit different colors depending on immediacy of a threat from the motorcycle being in the blind spot region.

In another aspect, an obstacle detection and notification system for a motorcycle is provided. The system includes a forward looking camera and a backward looking camera mountable to the motorcycle, a cellular connectivity device, an enhanced map database including a navigation map and a collision risk map layer of crowd sourced, georeferenced collision data, and a Global Positioning System (GPS) device providing a location of the motorcycle. A processor is in operable communication with the of the forward looking camera and the backward looking camera, the cellular connectivity device, the enhanced map database, and the GPS device. The processor executes program instructions to execute processes including: reporting any accident conditions via the cellular connectivity device, receiving updates to the collision risk map layer via the cellular connectivity device, determining a risk of a collision based on the location of the motorcycle from the GPS device and the collision risk map layer, receiving video from the forward looking camera and the backward looking camera, performing a computer vision and machine learning based object detection and tracking process to detect, classify and track obstacles in the video and to output detected object data, performing obstacle proximity detection processing using the detected object data to provide detected obstacle data, outputting audible, tactile or visual feedback, via an output system, to a rider of the motorcycle based on the detected obstacle data, and adapting the obstacle proximity detection processing and the outputting of audible, tactile or visual feedback based on the determined risk of collision.

In embodiments, the obstacle proximity detection processing is adapted based on the determined risk of collision so as to spatially focus the obstacle proximity detection processing on a region of the video corresponding to a location where the determined risk of collision is high.

In embodiments, audible, tactile or visual feedback is output, via an output system, to a rider of the motorcycle based on the determined risk of a collision.

In embodiments, the obstacle proximity detection processing is adapted based on the determined risk of collision so as to become active or increase in processing frequency when the determined risk of collision is relatively high.

In embodiments, the outputting of audible, tactile or visual feedback is adapted so as to visually identify an increased risk of collision when the determined risk of collision is relatively high.

In embodiments, reporting any accident conditions via the cellular connectivity device includes reporting location and time, the collision risk map layer includes georeferenced collision data and time referenced collision data, and the processes include determining the risk of the collision based on the location of the motorcycle from the GPS device, current time and the collision risk map layer.

In embodiments, the processes include determining an accident condition based on a high acceleration event and determining the high acceleration event based on data from of the GPS device, an inertial measurement unit and computer vision processing of the video.

In another aspect, an obstacle detection and notification system for a motorcycle is provided. The system includes a forward looking thermal camera and a backward looking thermal camera mountable to the motorcycle and a processor in operable communication with the forward looking thermal camera and the backward looking thermal camera. The processor executes processes including receiving video from the forward looking thermal camera and the backward looking thermal camera, performing a computer vision and machine learning based object detection and tracking process to detect, classify and track obstacles in the video and to output detected object data, performing obstacle proximity detection processing using the detected object data to provide detected obstacle data, and outputting audible, tactile or visual feedback, via an output system, to a rider of the motorcycle based on the detected obstacle data.

In embodiments, a cellular connectivity device is included. The processes include reporting any accident conditions based on data from of a GPS device, a inertial measurement unit and computer vision process of the video.

In embodiments, performing obstacle proximity detection processing includes identifying an animal presenting an obstacle in the road.

In embodiments, performing obstacle proximity detection processing includes identifying an animal presenting an obstacle in the road and reporting an accident condition includes reporting the identified animal presenting the obstacle in the road.

In embodiments, the processes include receiving crowd sourced, georeferenced and time referenced data concerning identified animals presenting obstacles in a road and outputting audible, tactile or visual feedback, via an output system, to a rider of the motorcycle based on the crowd sourced, georeferenced and time referenced data.

In embodiments, the computer vision and machine learning based object detection and tracking process detects and classifies a snake or other non-human animal in the video and outputs corresponding detected object data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
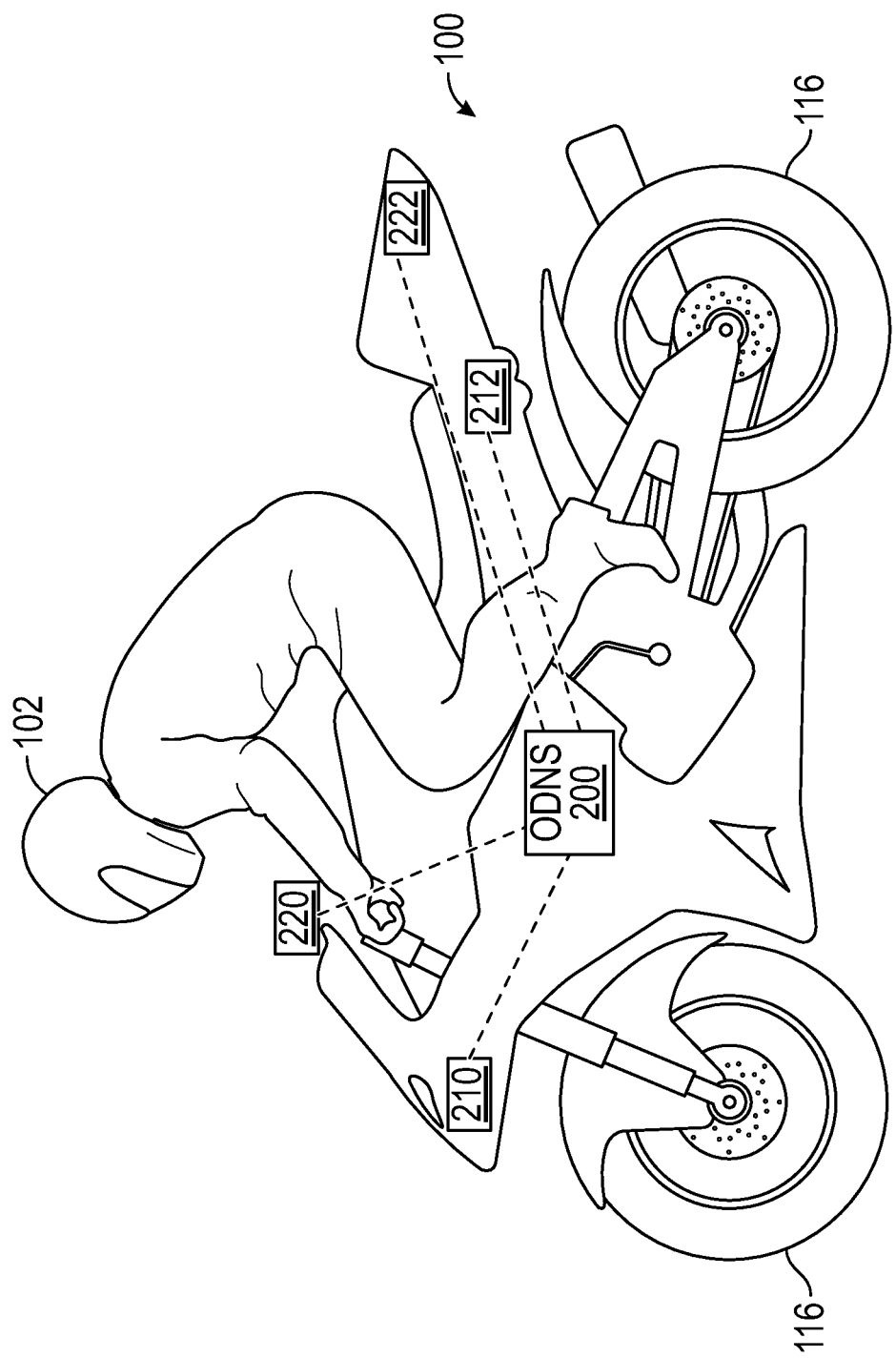
FIG. 1 is a functional block diagram of a motorcycle that includes an obstacle detection and notification system, in accordance with an exemplary embodiment.

FIG. 1 illustrates a motorcycle 100 according to an exemplary embodiment. As described in greater detail further below, the motorcycle 100 includes an obstacle detection and notification system 200 (ODNS) including dual camera machine visioning (MV) with artificial intelligent technology (AI) to detect and predict obstacles and provide feedback to a rider of the motorcycle 100.

As depicted in FIG. 1, the motorcycle 100 includes, in addition to the above-referenced ODNS 200, a body 114 and two wheels 116. The rider wears a helmet 102, which may be communicatively coupled to the ODNS 200, as described further below. The body 114 includes an engine (not shown), a braking system (not shown) and handles (not shown) for steering a front wheel. In one embodiment, the engine comprises a combustion engine. In other embodiments, the engine is an electric motor/generator, instead of, or in addition to, the combustion engine. Still referring to FIG. 1, the engine is coupled to at least one of the wheels 116 through one or more transmission systems. The braking system provides braking for the motorcycle 100. The braking system receives inputs from the driver via a brake pedal (not depicted) or a brake lever and provides appropriate braking via brake units (also not depicted). The driver also provides inputs via an accelerator handle (not depicted) as to a desired speed or acceleration of the motorcycle 100.

Referring back to the exemplary embodiment of FIG. 1, the motorcycle 100 includes one or more cameras 210, 212 as part of a computer vision system. The one or more cameras 210, 212 can include a forward-looking camera 210 to capture an external scene ahead of the motorcycle 100 and a backward-looking camera 212 to capture an external scene behind the motorcycle 100. The forward-looking camera(s)

210 can be positioned above a motorcycle headlight, beneath the motorcycle headlight, within the motorcycle headlight (e.g. if it is integrated thereto during the manufacturing thereof), or in any other manner that provides the forward-looking camera(s) with a clear view to the area in front of the motorcycle 100. The backward-looking camera(s) 212 can be positioned above a motorcycle rear light, beneath the motorcycle rear light, within the motorcycle rear light (e.g. if it is integrated thereto during the manufacturing thereof), or in any other manner that provides the backward-looking camera(s) 212 with a clear view to the area in the back of the motorcycle 100. The cameras 210, 212 may be wide angled cameras capable of viewing any angle above 60°, 90°, or even in the range of 130° to 175° or more of a forward scene or backward scene. The cameras 210, 212 may be monocular cameras and may provide at least RGB (Red, Green, Blue) video (made up of frames of image data). In other embodiments, the cameras 210, 212 are stereoscopic cameras. In some embodiments herein, the cameras 210, 212 include thermal imaging (or infrared) capabilities. The forward-looking camera(s) 210 and the backward-looking camera(s) 212 can have a resolution of at least two Mega-Pixel (MP), and in some embodiments at least five MP. The forward-looking camera(s) 210 and the backward-looking camera(s) 212 can have a frame rate of at least twenty Frames-Per-Second (FPS), and in some embodiments at least thirty FPS. Additional cameras may be included such as forward-looking and backward looking narrow angle cameras, which may have greater accuracy at larger ranges.

Figure 2:
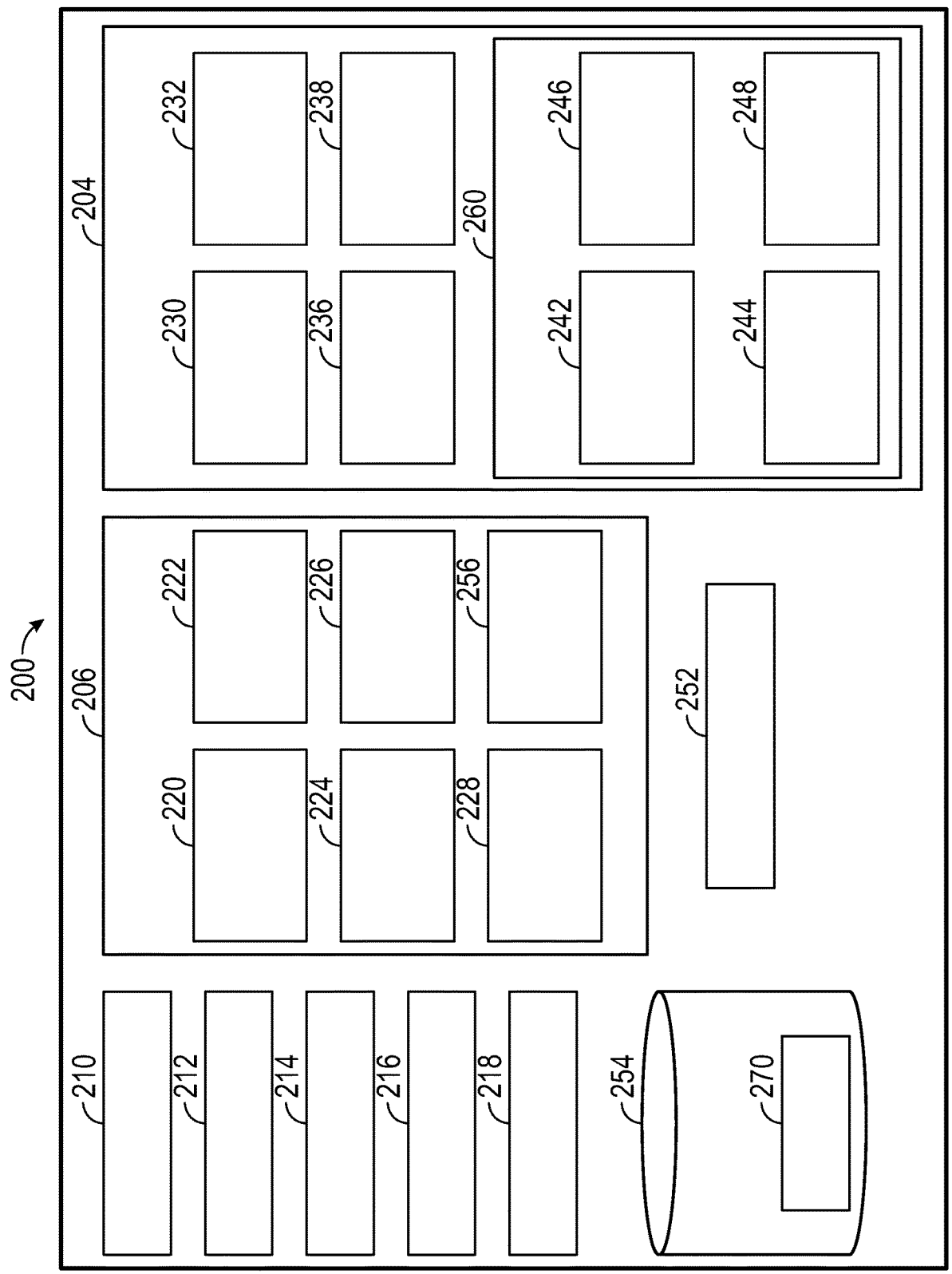
FIG. 2 is a functional block diagram of the obstacle detection and notification system of FIG. 1, in accordance with an exemplary embodiment.

Although FIG. 1 shows the forward-looking camera(s) 210 and the backward-looking camera(s) 212, the motorcycle can include additional sensors including forward-looking and/or backward-looking radar device(s) 214 (as shown in FIG. 2), a plurality of laser range finders, or any other sensor that can support obstacle detection and prediction.

With additional reference to FIG. 2, the ODNS 200 includes a controller 204, an output system 206, the forward and backward looking cameras 210, 212, the radar device 214, a cellular connectivity device 216, a GPS device 218, a local communications device 252 and an enhanced map database 254, in an exemplary embodiment. The ODNS 200 monitors a surrounding area of the motorcycle 100 for proximity events including at least one of: vehicles in a rider's blind spots, rider is possibly in other vehicles blind spots (reverse blind spot), common road objects (e.g. approaching an unexpected stopped vehicle, pedestrians, etc.), unusual road objects (e.g. desert animals laying on warm road at nighttime), and fast approaching vehicles from behind. The ODNS 200 may predict potential collisions (e.g. a vehicle unexpectedly pulling out in front of the motorcycle 100) using georeferenced high-risk motorcycle collision locations obtained from previous collision data via a telematics feed. Various outputs may be provided to both the rider and external vehicles such as activating a rear brake light on the motorcycle when a vehicle is fast approaching the motorcycle 100, for example. The ODNS 200, in one example, provides these functions in accordance with the methods 400, 500 and 600 described further below in connection with FIGS. 4 to 6. The ODNS 200 includes hardware to be installed onto the motorcycle and associated software embodied in the controller 204 that controls the functions described herein. The ODNS 200 may be installed on the motorcycle 100 by technicians as a retrofit or during manufacturing of the motorcycle 100. Some elements of the ODNS 200 may be included in a rider's mobile telecommunications device such as the controller 204 (or part thereof), the rider lighting display device 220 and the video display device 228. The rider light display device 220 would be graphically presented on a display of the mobile telecommunications device rather than through LEDs as in the integrated hardware system described further herein.

Continuing to refer to FIG. 2, a functional block diagram is provided for the ODNS 200 of FIG. 1, in accordance with an exemplary embodiment. The controller 204 is coupled to the cameras 210, 212, the radar device 214, the cellular connectivity device 216, the GPS device 218, the enhanced map database 254, the local communications device 252 and the output system 206. The controller 204 receives video data from the cameras 210, 212 and, based thereon, performs computer vision based and machine learning based object detection and tracking, reverse blind spot detection, collision risk prediction, obstacle proximity detection and other operations described further herein. The controller 204 provides rider feedback concerning detected obstacles or potential obstacles, The controller 204 may additionally provide feedback to other vehicles and potentially also to electronically controlled components of the motorcycle 100 so as to implement, for example, automatic braking, automatic throttle control, automatic gear shifting, etc. The controller 204 can be located under a seat of the motorcycle 100, but can alternatively be located in other places in a motorcycle such as behind a display panel between the handles of the motorcycle 100. The controller 204 can be connected to a battery of the motorcycle 100, or it can have its own power supply.

As depicted in FIG. 2, the controller 204 comprises a computer system. In the depicted embodiment, the computer system of the controller 204 includes a processor 230, a memory 232, a storage device 236, and a bus 238. The processor 230 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 230 executes one or more programs 240 contained within the memory 232 and, as such, controls the general operation of the controller 204 and the computer system of the controller 204, generally in executing the processes described herein, such as the methods 400, 500, 600 described further below in connection with FIGS. 4 to 6. The one or more computer programs 240 include at least an object detection and tracking module 242, an obstacle proximity detection module 246, a reverse blind spot detection module 244 and a collision risk prediction module 248 for performing steps of the methods 400, 500, 600 described in detail below.

The processor 230 is capable of executing one or more programs (i.e., running software) to perform various tasks encoded in the program(s), particularly the object detection and tracking module 242, the obstacle proximity detection module 246, the reverse blind spot detection module 244 and the collision risk prediction module 248. The processor 230 may be a microprocessor, microcontroller, application specific integrated circuit (ASIC) or other suitable device as realized by those skilled in the art.

The memory 232 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 232 is located on and/or co-located on the same computer chip as the processor 230.

The bus(es) 238 serves to transmit programs, data, status and other information or signals between the various components of the computer system of the controller 204 and between the various hardware components including the output system 206, forward and backward looking cameras 210, 212, the cellular connectivity device 216, the GPS device 218, the local communications device 252 and the enhanced map database 254. The bus(es) 238 can be any suitable physical or logical means of connecting computer systems and components. This includes, but is not limited to, direct hard-wired connections, fiber optics, infrared and wireless bus technologies.

The storage device 236 can be any suitable type of storage apparatus, including direct access storage devices such as hard disk drives, flash systems, floppy disk drives and optical disk drives. In one exemplary embodiment, the storage device 236 comprises a program product from which memory 232 can receive a program 240 (including computer modules 242, 244, 246, 248) that executes one or more embodiments of one or more processes of the present disclosure, such as the steps of the methods 400, 500 and 600 (and any sub-processes thereof). In another exemplary embodiment, the program product may be directly stored in and/or otherwise accessed by the memory 232 and/or a disk (e.g., disk), such as that referenced below. The enhanced map database 254 may be stored on the memory 232.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 230) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

In the exemplary embodiment of FIG. 2, the output system 206 includes at least one of: a rider lighting display device 220, an external lighting system 222, a rider speaker 224, a tactile feedback device 226, a video display device 228 and an external speaker 256. The output system 206 is responsive to output data from the controller 204 to provide visual, audible or tactile feedback to a rider of the motorcycle 100 or to a driver of an external vehicle. Upon identification of a threat to the motorcycle 100 by the controller 204, the controller 204 commands an alert to a rider of the motorcycle 100 in order to enable the rider to perform measures to eliminate or reduce any risk. The alerts can be provided in any manner that can be sensed by a rider of the motorcycle 100. In some cases, the alert can be visual provided via the rider lighting display device 220, tactile via the tactile feedback device 226 and/or audible via the rider speaker 224. Some parts of the output system 206 may be included in the helmet 102 such as the rider speaker 224, the tactile feedback device 226 and/or the rider lighting display device 220. The local communications device 252 allows the controller 204 to send data to the helmet 102 through any suitable local communications protocol such as Bluetooth or WiFi. In one embodiment, the local communications device 252 is facilitated through a local communications capability of a rider's mobile telecommunications device.

Figure 3:
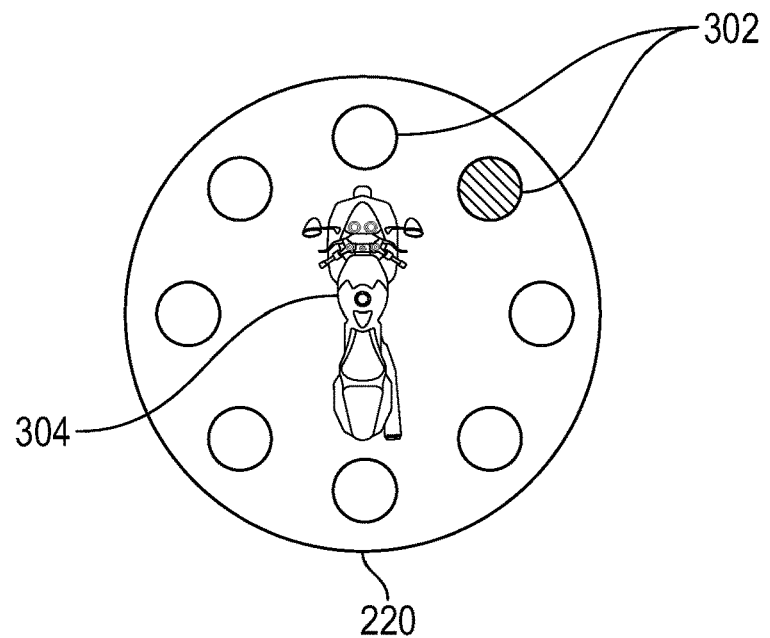
FIG. 3 is a rider lighting display device included in the obstacle detection and notification system of FIGS. 1 and 2, in accordance with an exemplary embodiment.

The rider lighting display device 220 of one example embodiment is shown in FIG. 3. The rider lighting display device 220 includes a plurality of light emitters 302 that can be activated to indicate presence and directionality of an obstacle or a potential obstacle. The rider lighting display device 220 includes a plurality of light emitters 302 arranged in a ring around a motorcycle orientation reference graphic 304. In the exemplary embodiment, there are eight light emitters 302 evenly distributed in the ring shape to provide eight degrees of directionality to the alert. However, more or less light emitters 302 could be provided. For example, four light emitters 304 could be included to provide four degrees of alert directionality including forward, backward, left and right. The light emitters 302 may be LEDs in one embodiment. The controller 204 may output data indicating directionality and severity of a collision threat and command the rider lighting display device 220 accordingly. In such an embodiment, the light emitters 302 can be controlled to emit different colors depending on the threat level such as red for server alert, orange for high alert, yellow elevated alert and green for low alert or some subset of two or three of these alert levels. Other arrangements of light emitters 302 that allow directionality and threat level severity are possible such as light strips arranged on mirrors of the motorcycle 100. The rider lighting display device 220 may also be controlled to differentiate a type of threat such as having different flashing frequencies for different threat types. The rider lighting display device 222 could be located in a display panel between the handles of the motorcycle 100 or could be projected onto or displayed by a shield of the helmet 102.

The external lighting system 222 includes existing or additional lights of the motorcycle 100 to indicate to drivers of external vehicles that they are a collision threat to the motorcycle when such a determination is made by the controller 204. For example, the external lighting system 222 provides notifications to drivers of other vehicles through a rear brake light (such as an LED) on the motorcycle 100 when, for example, the controller 204 determines that a vehicle is fast approaching the motorcycle from behind. In this instance, the motorcycle rider may get a notification via the rider lighting display device 220 and the driver of the vehicle receives a notification via the rear brake light or other rear light of the external lighting system 222. Front and/or side external lights could also be included as additional lights or as part of the existing lights of the motorcycle 100 to alert external drivers in front of the motorcycle 100 and to the sides of the motorcycle 100. The external speaker 256, which may be an integrated horn of the motorcycle 100 or an additional device, may additionally or alternatively provide a warning to external vehicles or humans of a collision threat with the motorcycle when such a collision threat has been determined by the controller 204. More than one external speaker 256 could be arranged around the motorcycle 100 to allow for directionality in the audible warning such as front, rear, left side and right side external speakers 256.

In embodiments, the warning notification can be a vibration provided to the rider of the motorcycle 100 via one or more vibrating or other tactile elements included in the tactile feedback device 226 causing vibration felt by the rider of the motorcycle 100. In some cases, the vibration can be adjusted in accordance with the threat severity, so that the higher the risk, the stronger the vibration. The vibration elements may additionally or alternatively be integrated into a jacket worn by the rider of the motorcycle 100, into the seat of the motorcycle 100, or into a helmet 102 worn by the rider of the motorcycle 100.

In embodiments, the alert is provided through the rider speaker 224. The alert is provided as a sound notification to the rider of the motorcycle 100 via the one or more rider speakers 224. The rider speakers 224 can be integrated into the helmet 102 of the rider, or any other speakers that generate sounds that can be heard by the rider of the motorcycle 100. In some cases, the sound notification can be a natural language voice notification, providing information of the specific threat type and/or severity identified and/or the direction of the threat. In some cases, the volume can be adjusted in accordance with the risk severity, so that the higher the risk, the higher the volume.

In embodiments, the video display device 228 provides a live video feed from the forward looking camera 210 and/or the backward looking camera 212. The live video feed may provide a focused area of the total video data based on a direction of the threat. The live video feed may be supplemented with graphical indications of any collision threats distinguishing different types of threats, different threat levels and the direction of the threat as determined by the controller 204. In some embodiments, video from the forward and backward looking cameras 210, 212 is recorded in the storage device 236.

The various possible output options of the output system 206 described above may be provided alone or in any combination. Having described the output system 206 and some example audible, visual or tactile feedback mechanisms to threat severity and directions determined by the controller 204, a more detailed description of the software operations of the controller will be provided.

Continuing to refer to the exemplary embodiment of FIG. 2, the object detection and tracking module 242 can be implemented through a number of object detection and tracking algorithms. In one embodiment, the object detection and tracking module 242 receives video data from the forward and backward looking cameras 210, 212 and runs the video data, or a derivative thereof, through a machine learning algorithm to classify and localize obstacles that the machine learning algorithm is trained to detect. The machine learning algorithm may include a Convolutional Neural Network (CNN) or other neural network. One example suitable machine learning algorithm is You Only Look Once (YOLO). The object detection part of the object detection and tracking module 242 provides detected object data including bounding box size, location and classification information. Various obstacle classifications are possible including vehicle, pedestrian, cyclist, non-human animal, etc. The object tracking part of the object detection and tracking module 242 tracks a detected object over time (plural frames of video data) in order to derive velocity and acceleration information for tracked objects and to predict the obstacle's path. In one embodiment, an extended Kalman filter using a motion model for the tracked object can be included in the object tracking part. The object detection and tracking module 242 uses intrinsic and extrinsic camera parameters and possibly also motion parameters from an Inertial Measurement Unit (not shown) or other motion sensors of the motorcycle 100 to provide detected object data in real world coordinates in a coordinate frame relative to the motorcycle 100. The object detection and tracking module 242 is thus able to output location, velocity, acceleration, path projection and classification data for each detected object in forward and backward looking scenes. This data is included in detected object data provided to the obstacle proximity detection module 246 and the reverse blind spot detection module 244. The object detection and tracking module 242 has been described at a relatively high level for the purposes of conciseness. It should be appreciated that a number of object detection and tracking applications are available in the literature that receive video data and use computer vision and machine learning processing to classify and track detected objects.

The obstacle proximity detection module 246 receives the detected object data and data on the motion of the motorcycle 100 from the IMU or from other motion sensors such as a wheel speed sensor. In this way, the obstacle proximity detection module 246 is able to project the path of the motorcycle 100 and the projected paths of moving obstacles to determine whether there is any collision threat or any potential spatial overlap with detected stationary obstacles. A collision threat may be determined by a projected collision occurring in less than a first predetermined time threshold. In some embodiments, a plurality of different time thresholds may be used so as to define different threat levels. Furthermore, the mutual motion projections between the motorcycle 100 and the various moving obstacles can be compared to determine a directionality of the threat by determining a direction relative to the motorcycle 100 that an obstacle is travelling. For stationary obstacles, the directionality can be determined based on a relative location between the motorcycle 100 and the detected location of the stationary object. The obstacle proximity and detection module 246 can output collision threat data that is indicative of collision threat severity level and directionality, which can be included in output data for output system 206 to activate various output devices as described above. The obstacle proximity and detection module 246 may additionally distinguish detected threat types in the output data.

The obstacle proximity detection module 246 detects a plurality of kinds of proximity events including vehicles in a rider's blind spots, a rider is possibly in other vehicles blind spots (reverse blind spot) as described further below, common road objects (e.g. approaching an unexpected stopped vehicle, pedestrians, etc.), unusual road objects (e.g. desert animals laying on warm road at nighttime) as described further herein, fast approaching vehicles from behind, potential collisions (e.g. a vehicle may unexpectedly pull out in front of the rider but has not yet) as described further herein, etc.

In some embodiments, the object detection and tracking module 242 is trained to detect non-human animals based on thermal imaging received from the forward-looking camera 210, the backward looking camera 212 or other forward or backward looking camera particularly suited to thermal imaging. Such an embodiment is designed to detect non-human animals in low visibility conditions such as fog and nighttime. The obstacle proximity detection module 246 receives the detected non-human animal data and responsively outputs a collision threat based on time to potential collision with the non-human animal, which will determine a threat level, and a direction of the threat. The output system 206 responsively outputs an indication of threat level and directionality and optionally also type of threat (e.g. via a specific color or sequence of light emitters 302 or a particular sound or annunciation from the rider speaker 224). In one embodiment, the non-human animal is a snake. Snakes and other desert animals can present a particular danger to motorcycles because they often lay on warm roads at nighttime.

In embodiments, the reverse blind spot detection module 244 receives the detected object data from the object detection and tracking module 244. The reverse blind spot detection module 244 determines one or more blind spot regions for one or more detected vehicles. A blind spot in a vehicle is an area around the vehicle that cannot be directly observed by the driver while at the controls. A blind spot may occur behind the side window at a location that is also not visible in the side view mirrors. Motorcycles are narrower than cars and are more liable to being wholly located within a vehicle's blind spot. The reverse blind spot detection module 244 may retrieve a predetermined blind spot region and connect it to a detected vehicle at a location where a blind spot would be. The predetermined blind spot region may be in image coordinates and scaled and rotated in image space according to a distance and orientation between the vehicle and the motorcycle 100, which can be performed based on camera intrinsic and extrinsic parameters. Alternatively, the predetermined blind spot region is provided in real world coordinates and the detected vehicles are transformed into real world space so that the predetermined blind spot regions can be connected thereto. In some embodiments, the object detection and tracking module 244 is trained to detect vehicles and additionally side view mirrors on the vehicles, which can additionally support accurate location of the blind spot region attached based on a bounding box around the side view mirrors. Alternatively, an average position relative to a bounding box around the vehicle could be used to connect the blind spot region. In some embodiments, the predetermined blind spot region is enlarged based on a relative speed between the other vehicle and the motorcycle 100. The relative speed is known from the detected object data output from the object detection and tracking module 242 as described above. In this way, the faster the closing speed, the more likely that a reverse blind spot detection is made to reflect that the driver of the other vehicle would have less time to check the side mirrors and spot the motorcycle 100.

The reverse blind spot detection module 244 may compare a location of the motorcycle 100 with the blind spot region(s) to determine whether the motorcycle is located within the blind spot region of any other vehicle. The location of the motorcycle 100 can be obtained by the GPS device 218 or from localization based on computer vision processing of the video data from the forward and backward looking cameras 210, 212. In another embodiment, the reverse blind spot detection module 244 can compare a path trajectory of the motorcycle 100, which can be determined based on a motion model for the motorcycle 100, and location, acceleration and velocity data for the motorcycle 100. The location, acceleration and velocity data for the motorcycle is obtained from GPS device 218 and/or motion sensors of the motorcycle 100. Based on whether the location of the motorcycle 100 is within a blind spot region or is projected to be within the blind sport region within a predetermined amount of time, the reverse blind spot detection module 244 provides output data indicating a reverse blind spot threat and a directionality thereof. The reverse blind spot detection module 244 may additionally output a threat level based on the proximity of the vehicle and the motorcycle in its blind sport region or based on their relative speeds. The output system 206 outputs visual, tactile or audible feedback, which identifies direction, severity and optionally also type of threat as described above.

In embodiments, the collision risk prediction module 248 predicts locations and times when there is an added risk of collision with an obstacle using crowd data regarding motorcycle, and possibly other, vehicle accidents or near accidents included in a collision risk map layer 270 of the enhanced map database 254. The collision risk map layer 270 is a map layer that is regularly updated with accident or near accident information through the cellular connectivity device 216. The cellular connectivity device 216 can be a 4G or 5G data communications device, for example. In some embodiments, the cellular connectivity device 216 is facilitated through a rider's mobile telecommunications device. The collision risk map layer 270 provides georeferenced and time referenced crowd data on where collisions or near collisions have occurred. In one embodiment, the collision risk map layer 270 distinguishes between motorcycle accidents or near accidents and those of other vehicles since the threats to a motorcycle can be different to those to other types of vehicle and the collision risk prediction module 248 operates on the motorcycle specific data. In one example, the collision risk map layer 270 may reflect a greater probability of collisions at a bar driveway location and time of day (e.g. after happy hour). The collision risk prediction module 248 filters the collision risk map layer 270 using the current time and current location of the motorcycle 100, which is known from the location data provided by the GPS device 218 so as to determine upcoming relatively high risk locations (e.g. locations where the collision risk is predicted to be greater than a threshold at the current time). The collision risk prediction module 248 may provide output data to the output system 206 indicating the directionality, a threat level and optionally a type of threat.

The collision risk prediction module 248 may provide the output data to the obstacle proximity detection module 246 and/or the object detection and tracking module 242. The obstacle proximity detection module 246 and/or the object detection and tracking module 242 is responsive to the collision risk indication and location in the output data to increase a frequency of, or activate, the object detection and obstacle proximity detection processes and/or to spatially focus the object detection and obstacle proximity processes based on the location of the collision risk. In an additional or alternative embodiment, the obstacle proximity detection module 246 can increase in sensitivity in response to the collision risk data from the collision risk prediction module so as to indicate a higher threat level or to lower proximity thresholds so as to more readily provide output data to the output system 206 describing a collision threat. As such, the ODNS is placed on high alert and is specifically focused when the collision risk map layer 270 predicts an upcoming (e.g. within set a range of the forward looking and backward looking cameras 210, 212) collision risk.

In embodiments, the controller 204 determines accident conditions based on high acceleration information being obtained from the IMU (not shown) or the GPS device 218. The controller 204 can ascertain from the acceleration information whether the motorcycle has been subjected to an impact or an emergency stop. The controller 204 reports such accident conditions along with location, time and optionally date information, which can be obtained from the GPS device 218, to a remote map server (not shown) through the cellular connectivity device 216. A crowd of motorcycles will similarly report accident conditions, allowing the remote map server to create a continually updating collision risk map layer 270 that is periodically pushed to the motorcycle 100 via the cellular connectivity device 216.

In one embodiment, the location and time of non-human animals (e.g. snakes on a road) detected by thermal imaging are reported to the remote map server as an accident condition for motorcycles. The collision risk map layer 270 can integrate crowd sourced times and locations for non-human animals being on the road. This information could alternatively be included in a different map layer. The collision risk prediction module 248 can factor in high risk of non-human animals being on the road at certain locations and at certain times of the day and provide output data representing the collision risk to the output system 206 and the object detection and tracking module 242 and the obstacle proximity detection module 246. In this way, object detection and tracking processing can be activated or increased in frequency when there is a collision risk above a predetermined threshold according to the non-human animal data in the collision risk map layer. The output system 206 can provide an audible, tactile or visual alert concerning the collision risk, which can identify directionality and optionally also type of non-human animal (e.g. a snake graphic). The obstacle proximity detection module 246 may increase in sensitivity (as described above) when there is a high risk of collision with a non-human animal on the road.

In embodiments, the ODNS 200 is in operable communication with an application on a rider's mobile telecommunications device. The rider's mobile telecommunications device with the designed application may be used for configuration of the various motorcycle module settings (e.g. warning thresholds, preferred alert methods, etc.). The application could also be used for pulling stored video from the cameras (action video, etc.) 210, 212 or recorded video from the storage device 236.

Figure 4:
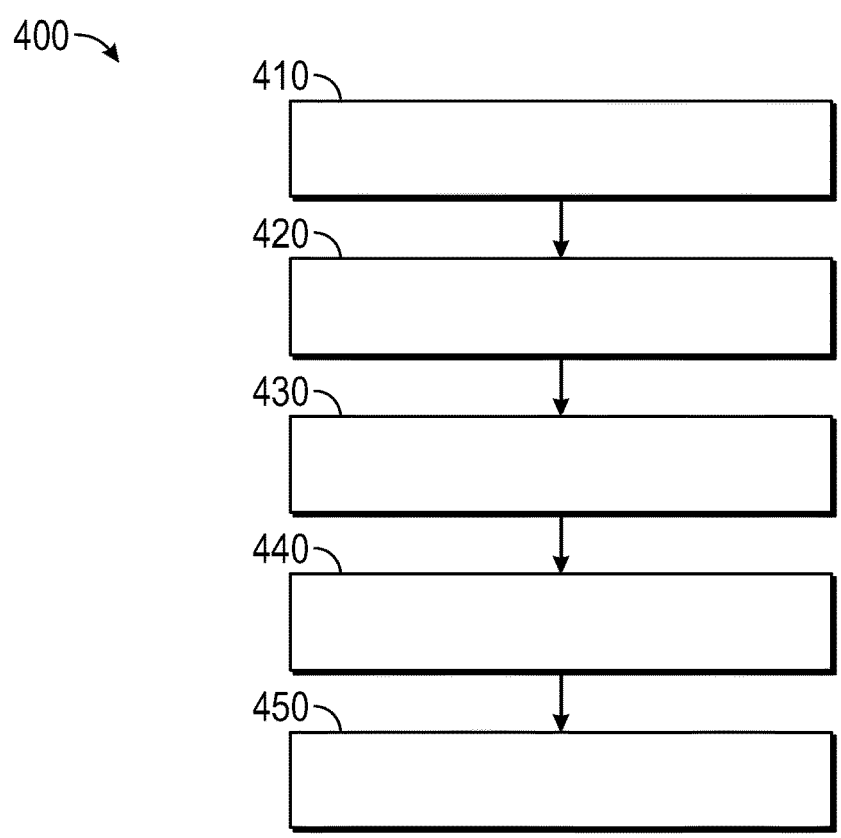
FIG. 4 is a flowchart of a method for implementing obstacle detection and notification including reverse blind spot detection, which can be used in connection with the motorcycle of FIG. 1 and the obstacle detection and notification system of FIG. 2, in accordance with an exemplary embodiment.

FIG. 4 is a flowchart of a method 400 for reverse blind spot detection, in accordance with one embodiment. The method 400 can be implemented in connection with the motorcycle 100 of FIG. 1 and the ODNS 200 of FIG. 2, in accordance with an exemplary embodiment. The method 400 may be implemented continuously during motorcycle operation or be invoked or increased in regularity based on collision risk data from the collision risk prediction module 248.

As depicted in FIG. 4, the method 400 includes the step 410 of receiving video data from the forward looking camera 210 and/or the backward looking camera. Object detection and tracking is performed on the video data to classify and localize other vehicles in step 430. In step 430, a blind spot region is defined around each detected vehicle or each detected vehicle within a certain range of the motorcycle 100. The blind spot regions may be changed in size based on a relative speed between the motorcycle 100 and the other vehicle so as to be enlarged, the greater the relative speed. In step 440, a determination is made whether the motorcycle 100 is located in a blind spot region or is projected to be located in a blind spot region within a predetermined amount of time. When a determination has been made of a reverse blind spot threat, audible, visual or tactile feedback is provided to the rider of the motorcycle 100 warning of the reverse blind spot threat, the direction of the threat and optionally also identifying the type of threat.

Figure 5:
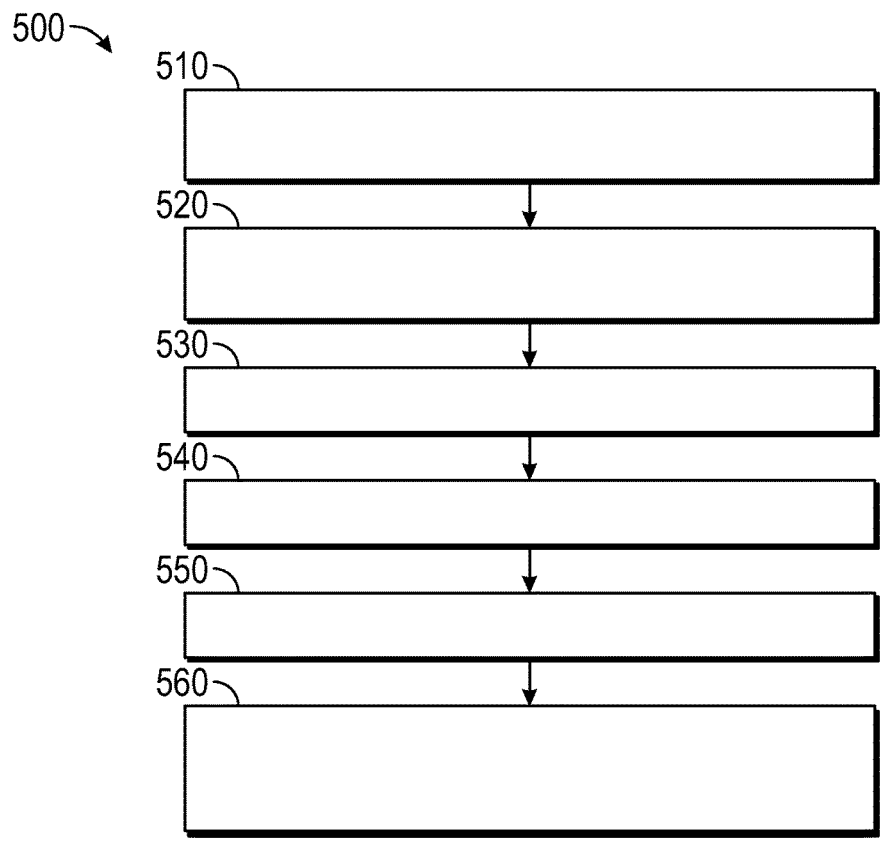
FIG. 5 is a flowchart of a method for implementing obstacle detection and notification including use of a collision risk heat map, which can be used in connection with the motorcycle of FIG. 1 and the obstacle detection and notification system of FIG. 2, in accordance with an exemplary embodiment.

FIG. 5 is a flowchart of a method 500 for collision risk determination, in accordance with one embodiment. The method 500 can be implemented in connection with the motorcycle 100 of FIG. 1 and the ODNS 200 of FIG. 2, in accordance with an exemplary embodiment. The method 500 may be implemented continuously during motorcycle operation.

In step 510, a collision risk is determined from collision risk data in a collision risk map layer 270 of the enhanced map database 254. The collision risk data is time referenced and georeferenced accident or near accident data reported from a crowd of motorcycles. Based on current time and current location of the motorcycle 100, any collision risk information is extracted from the collusion risk map layer 270 and assessed for relevance based on the collision risk being above a predetermined threshold. An indication of the upcoming collision risk and the direction of the collision risk is output for further processing in step 560.

In step 520, video data is received from the forward looking camera 210 and/or the backward looking camera 212. In step 530, object detection and tracking is performed based on the video data to classify and localize objects in the captured scene. In step 540, obstacle proximity detection is performed using the detected object data from step 530 including detecting vehicles in rider's blind spots, detecting common road objects (e.g. approaching an unexpected stopped vehicle, pedestrians, etc.), and detecting unusual road objects (e.g. desert animals laying on warm road at nighttime). The obstacle proximity detection step 540 further determines directionality and immediacy of any proximity threat and outputs corresponding collision threat data. In step 550, audible, visual and/or tactile feedback is provided to the rider through the output system 206 based on the collision threat data to indicate to the rider the direction of the collision threat, the existence of the collision threat and optionally also the type of collision threat.

In step 560, the object detection and tracking step 530 is adapted and/or the obstacle proximity detection step 560 is adapted and/or the rider feedback step 550 is adapted when collision risk data from step 510 is determined based on the collision risk map layer 270. That is, steps 530 and 540 may be adapted so as to become active from a dormant state or steps 530 and 540 may be increased in frequency. Additionally, or alternatively, steps 530 and 540 may be adapted to spatially focus on a region of the video data in which a high collision risk has been determined. Additionally, or alternatively, the sensitivity of step 540 may be heightened by changing proximity thresholds used in detecting collision threats so as to more readily output an indication of a proximal collision threat. Additionally, the output system 206 may issue an audible, tactile and/or visual alert regarding a potential collision risk identified in step 510 including the direction and optionally also the type of collision risk (e.g. increased traffic from a bar at this time causing accident conditions, snakes on the road at this time, etc.).

Figure 6:
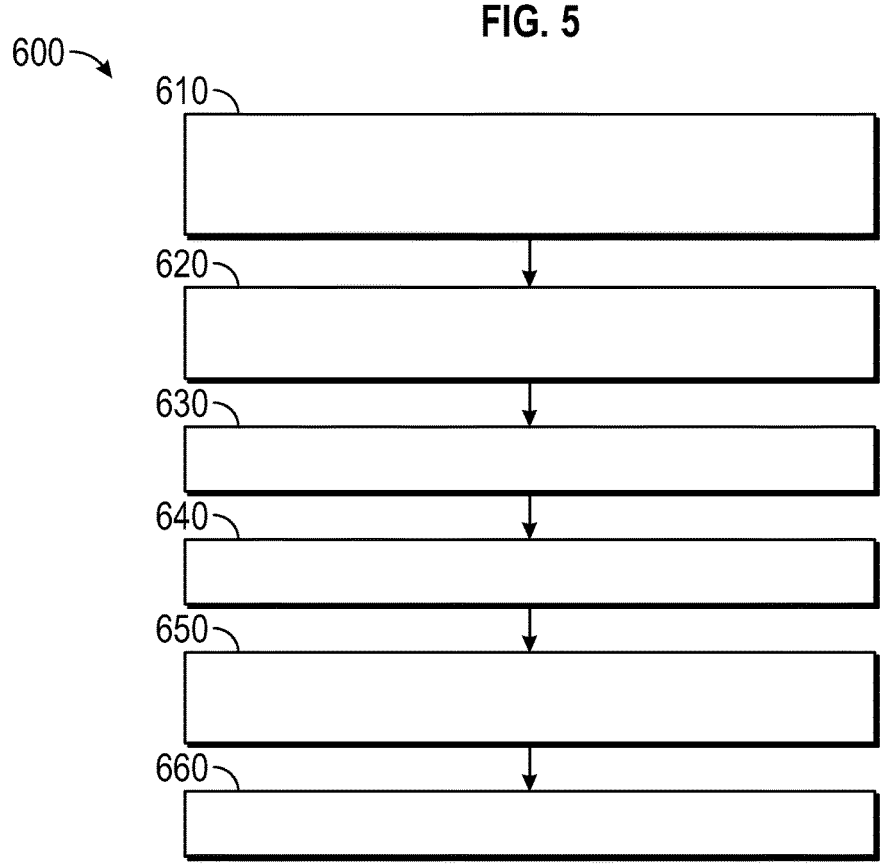
FIG. 6 is a flowchart of a method for implementing obstacle detection and notification including performing animal detection using thermal imaging, which can be used in connection with the motorcycle of FIG. 1 and the obstacle detection and notification system of FIG. 2, in accordance with an exemplary embodiment.

FIG. 6 is a flowchart of a method 600 for detecting non-human animals on a road, in accordance with one embodiment. The method 600 can be implemented in connection with the motorcycle 100 of FIG. 1 and the ODNS 200 of FIG. 2, in accordance with an exemplary embodiment. The method 600 may be implemented continuously during motorcycle operation or may become active or increased in frequency based on the collision risk data from the collision risk prediction module indicating potential for non-human animals on the road in the vicinity of the motorcycle 100.

In step 610, video data is received from a forward looking thermal camera and/or a backward looking thermal camera. In step 620, object detection and tracking are performed to localize and classify objects including non-human animals that will show up vividly in the thermal imaging. The object detection and tracking processes may be trained to label non-human animals as a category or to specify one or more types of non-human animal such as snakes. In step 630, obstacle proximity detection is performed to detect proximal collision threats including collision threats with detected non-human animals. In step 640, the detected non-human animals are reported to a remote map server through the cellular connectivity device 216. In step 650, a map update including crowd detected non-human animals is received. The map update includes time and location for each detection. The map update is included in the enhanced map database 254 possibly as part of the collision risk map layer. In this way, the method 500 described above with respect to FIG. 5 takes into account georeferenced and time referenced non-human animals on the road when determining the collision risk data. In step 660, audible, tactile and/or visual rider feedback is provided to the non-human rider when step 630 determines a proximal collision threat because of a detected non-human animal on the road. The rider feedback can indicate direction, severity (e.g. immediacy) and optionally the type of threat (e.g. distinguishing a non-human animal from other types of threat or specifying the detected type of non-human animal such as a snake).

It will be appreciated that the disclosed methods, systems, and motorcycles may vary from those depicted in the Figures and described herein. For example, the motorcycle 100 and the ODNS 200 and/or various components thereof may vary from that depicted in FIGS. 1 and 2 and described in connection therewith. In addition, it will be appreciated that certain steps of the method 400 may vary from those depicted in FIGS. 4, 5 and 6 and/or described above in connection therewith. It will similarly be appreciated that certain steps of the method described above may occur simultaneously or in a different order than that depicted in FIGS. 4, 5 and 6.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An obstacle detection and notification system for a motorcycle, the system comprising:
    at least one of a forward looking camera and a backward looking camera mountable to the motorcycle;
    a cellular connectivity device;
    an enhanced map database including a navigation map and a collision risk map layer of crowd sourced, georeferenced collision data;
    a Global Positioning System (GPS) device providing a location of the motorcycle; and
    at least one processor in operable communication with the at least one of the forward looking camera and the backward looking camera, the cellular connectivity device, the enhanced map database, and the GPS device, the at least one processor configured to execute program instructions, wherein the program instructions are configured to cause the at least one processor to execute processes including:
    reporting any accident conditions via the cellular connectivity device;
    receiving updates to the collision risk map layer via the cellular connectivity device;
    determining a risk of a collision based on the location of the motorcycle from the GPS device and the collision risk map layer;
    receiving video from the at least one of the forward looking camera and the backward looking camera;
    performing a computer vision and machine learning based object detection and tracking process to detect, classify and track obstacles in the video and to output detected object data;
    performing obstacle proximity detection processing using the detected object data to provide detected obstacle data; and
    outputting audible, tactile or visual feedback, via an output system, to a rider of the motorcycle based on the detected obstacle data, wherein:
        at least one of the object detection and tracking process and the obstacle proximity detection processing is adapted based on the determined risk of collision, wherein the object detection and tracking process and/or the obstacle proximity detection processing is adapted based on the determined risk of collision so as to be performed at an increased processing frequency at locations where the determined risk of collision is determined to be greater than a threshold.

2. An obstacle detection and notification system for a motorcycle, the system comprising:
    at least one of a forward looking camera and a backward looking camera mountable to the motorcycle;
    a cellular connectivity device;
    an enhanced map database including a navigation map and a collision risk map layer of crowd sourced, georeferenced collision data;
    a Global Positioning System (GPS) device providing a location of the motorcycle; and
    at least one processor in operable communication with the at least one of the forward looking camera and the backward looking camera, the cellular connectivity device, the enhanced map database, and the GPS device, the at least one processor configured to execute program instructions, wherein the program instructions are configured to cause the at least one processor to execute processes including:
    reporting any accident conditions via the cellular connectivity device;
    receiving updates to the collision risk map layer via the cellular connectivity device;
    determining a risk of a collision based on the location of the motorcycle from the GPS device and the collision risk map layer;
    receiving video from the at least one of the forward looking camera and the backward looking camera;
    performing a computer vision and machine learning based object detection and tracking process to detect, classify and track obstacles in the video and to output detected object data;
    performing obstacle proximity detection processing using the detected object data to provide detected obstacle data; and outputting audible, tactile or visual feedback, via an output system, to a rider of the motorcycle based on the detected obstacle data, wherein:
at least one of the object detection and tracking process and the obstacle proximity detection processing is adapted based on the determined risk of collision, wherein the object detection and tracking process and/or the obstacle proximity detection processing is adapted based on the determined risk of collision so as to spatially focus the object detection and tracking process and/or the obstacle proximity detection processing on a region of the video corresponding to a location where the determined risk of collision is determined to be greater than a threshold.

3. The obstacle detection and notification system of claim 1, comprising outputting audible, tactile or visual feedback, via an output system, to a rider of the motorcycle based on the determined risk of a collision.

4. The obstacle detection and notification system of claim 2, wherein the object detection and tracking process and/or the obstacle proximity detection processing is adapted based on the determined risk of collision so as to become active or increase in processing frequency when the determined risk of collision is relatively high.

5. The obstacle detection and notification system of claim 1, wherein the outputting of audible, tactile or visual feedback is adapted so as to visually identify an increased risk of collision when the determined risk of collision is relatively high.

6. The obstacle detection and notification system of claim 1, wherein:
reporting any accident conditions via the cellular connectivity device includes reporting location and time;
the collision risk map layer includes georeferenced collision data and time referenced collision data; and
determining the risk of the collision is based on the location of the motorcycle from the GPS device, current time and the collision risk map layer.

7. The obstacle detection and notification system of claim 1, wherein the program instructions are configured to cause the at least one processor to execute processes including determining an accident condition based on a high acceleration event and determining the high acceleration event based on data from at least one of the GPS device, an inertial measurement unit and computer vision processing of the video.

8. The obstacle detection and notification system of claim 2, wherein performing obstacle proximity detection processing includes identifying a non-human animal presenting an obstacle in the road.

9. The obstacle detection and notification system of claim 2, wherein performing obstacle proximity detection processing includes identifying a non-human animal presenting an obstacle in the road and wherein reporting any accident conditions includes reporting the identified non-human animal presenting the obstacle in the road.

10. The obstacle detection and notification system of claim 8, wherein the program instructions are configured to cause the at least one processor to execute processes including receiving crowd sourced, georeferenced and time referenced data concerning identified non-human animals presenting obstacles in a road and outputting audible, tactile or visual feedback, via an output system, to a rider of the motorcycle based on the crowd sourced, georeferenced and time referenced data.

11. The obstacle detection and notification system of claim 2, wherein performing the computer vision and machine learning based object detection and tracking process detects and classifies a snake on the road in the video and outputs corresponding detected object data.

12. An method of obstacle detection and notification system for a motorcycle, the method comprising:
at least one of a forward looking camera and a backward looking camera mountable to the motorcycle;
a cellular connectivity device;
an enhanced map database including a navigation map and a collision risk map layer of crowd sourced, georeferenced collision data;
a Global Positioning System (GPS) device providing a location of the motorcycle; and
at least one processor in operable communication with the at least one of the forward looking camera and the backward looking camera, the cellular connectivity device, the enhanced map database, and the GPS device, the at least one processor configured to execute program instructions, wherein the program instructions are configured to cause the at least one processor to execute processes including:
reporting, via at least one processor associated with the motorcycle, any accident conditions via a cellular connectivity device associated with the motorcycle;
receiving, via the at least one processor, updates to a collision risk map layer of crowd sourced, georeferenced collision data via the cellular connectivity device, the collision risk map layer included in an enhanced map database associated with the motorcycle, the collision risk map layer including a navigation map and the collision risk map layer;
determining, via the at least one processor, a risk of a collision based on a location of the motorcycle and the collision risk map layer, the location of the motorcycle obtained from a GPS device associated with the motorcycle;
receiving, via the at least one processor, video from at least one of a forward looking camera and a backward looking camera associated with the motorcycle;
performing, via the at least one processor, a computer vision and machine learning based object detection and tracking process to detect, classify and track obstacles in the video and to output detected object data;
performing, via the at least one processor, obstacle proximity detection processing using the detected object data to provide detected obstacle data; and
outputting audible, tactile or visual feedback, via an output system, to a rider of the motorcycle based on the detected obstacle data, wherein:
at least one of the object detection and tracking process and the obstacle proximity detection processing is adapted based on the determined risk of collision, wherein the object detection and tracking process and/or the obstacle proximity detection processing is adapted based on the determined risk of collision so as to be performed at an increased processing frequency at locations where the determined risk of collision is determined to be greater than a threshold.

13. The method of claim 12, comprising outputting audible, tactile or visual feedback, via the output system, to a rider of the motorcycle based on the determined risk of a collision.

14. The method of claim 12, wherein the outputting of audible, tactile or visual feedback is adapted so as to visually identify an increased risk of collision when the determined risk of collision is relatively high.

15. The method of claim 12, wherein:
reporting any accident conditions via the cellular connectivity device includes reporting location and time;
the collision risk map layer includes georeferenced collision data and time referenced collision data; and
determining the risk of the collision is based on the location of the motorcycle from the GPS device, current time and the collision risk map layer.

16. The method of claim 12, comprising determining, via the at least one processor, an accident condition based on a high acceleration event and determining the high acceleration event based on data from at least one of the GPS device, an inertial measurement unit and computer vision processing of the video.

17. The method of claim 12, wherein performing obstacle proximity detection processing includes identifying a non-human animal presenting an obstacle in the road.

18. The method of claim 12, wherein performing obstacle proximity detection processing includes identifying a non-human animal presenting an obstacle in the road and wherein reporting any accident conditions includes reporting the identified non-human animal presenting the obstacle in the road.

\* \* \* \* \*